A. J. OHMER.
Dish-Covers.
No. 136,856.　　　　　　　　　　　　　　Patented March 18, 1873.
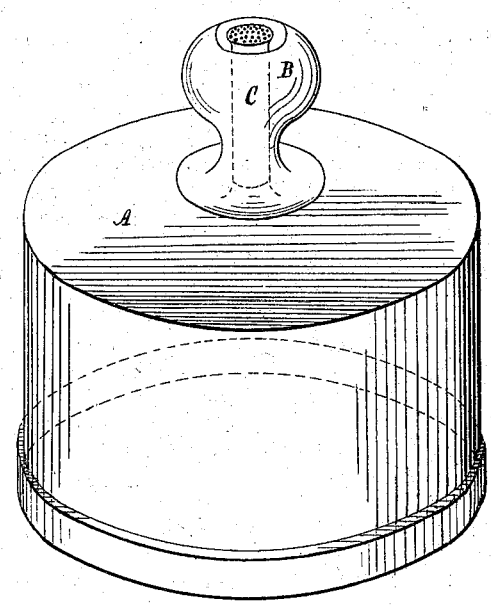

UNITED STATES PATENT OFFICE.

AUGUSTUS J. OHMER, OF HAMILTON, OHIO.

IMPROVEMENT IN DISH-COVERS.

Specification forming part of Letters Patent No. 136,856, dated March 18, 1873.

*To all whom it may concern:*

Be it known that I, AUGUSTUS J. OHMER, of Hamilton, in the county of Butler and State of Ohio, have invented a new and useful Improvement in Glass Covers; and I do hereby declare that the following is a full and exact description thereof, reference being had to the accompanying drawing and to the letters of reference marked thereon.

Figure 1 represents a perspective view of my improved glass cover. Fig. 2 represents a perforated metal tube used in the ventilating-orifice of the cover.

My invention relates to a new article of glass manufacture, being a ventilated glass cover for protecting edibles.

The glass covers in common use for this purpose are not provided with a ventilating-orifice, and consequently edibles confined beneath them soon become stale and unfit for use.

The necessity of making the ventilating-orifice at the center of the top of the cover and through the glass knob to receive and hold a suitable screen to prevent the entrance of flies rendered it necessary to make various experiments to attain success and produce my improved glass cover.

The cover A is provided with the knob B, and the ventilating-orifice extends through the cover and its knob or handle, and is provided with the removable tube C, having its upper end covered with a perforated cap to prevent flies or other insects from entering through the orifice.

To manufacture my ventilated cover, two workmen are required. While one gathers the metal and forms the cover the other workman constructs the knob, and each retains his part when formed with its orifice; and at the same time the workmen warm the parts sufficiently to cause them to adhere when united, when, with great care and precision, the knob is united with the cover so as to bring the orifices in conjunction to constitute the single ventilating-orifice.

These ventilated glass covers are to be used to protect cakes, pies, and other edibles upon the counters of lunch-houses or upon tables.

I have found, from long use of the close covers and experimental use of my improved covers, that pies, cakes, and other cooked edibles become stale much sooner under the close covers than when placed under my perforated covers.

Having described my improved glass covers, I claim and desire to secure by Letters Patent—

The glass cover A, provided with the orifice passing out through knob B, as a new article of manufacture, for the purpose described.

In testimony whereof I have hereunto set my hand this 20th day of May, A. D. 1872.

A. J. OHMER.

Witnesses:
  H. P. K. PECK,
  JOHN M. DAVIDSON.